United States Patent
Kim et al.

(10) Patent No.: US 11,713,201 B1
(45) Date of Patent: Aug. 1, 2023

(54) VACUUM-TYPE POWDER TRANSFER SYSTEM AND METHOD

(71) Applicant: SK ON CO., LTD., Seoul (KR)

(72) Inventors: In Mok Kim, Daejeon (KR); Ji Yun Yang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/148,250

(22) Filed: Dec. 29, 2022

(30) Foreign Application Priority Data

Feb. 18, 2022 (KR) .......................... 10-2022-0021502

(51) Int. Cl.
*B65G 53/60* (2006.01)
*B65G 53/24* (2006.01)
*B65G 53/66* (2006.01)

(52) U.S. Cl.
CPC ............ *B65G 53/24* (2013.01); *B65G 53/66* (2013.01)

(58) Field of Classification Search
None
See application file for complete search history.

(56) References Cited

U.S. PATENT DOCUMENTS

| | | | | |
|---|---|---|---|---|
| 3,306,671 A | * | 2/1967 | Leeman | B01J 19/00 406/123 |
| 4,197,037 A | * | 4/1980 | Dede | B65G 53/24 406/128 |
| 4,900,200 A | * | 2/1990 | Harumoto | B65G 53/26 406/122 |
| 5,147,152 A | * | 9/1992 | Link | G01G 19/22 406/33 |
| 5,322,074 A | * | 6/1994 | Cross, Jr. | A24C 5/391 131/108 |
| 5,645,381 A | * | 7/1997 | Guidetti | B65G 53/528 406/173 |
| 6,068,429 A | * | 5/2000 | Schultheis | B65G 53/60 406/172 |
| 6,220,790 B1 | * | 4/2001 | Schenk | B65G 53/528 406/3 |
| 6,776,561 B1 | * | 8/2004 | Yeh | B01F 33/8051 141/105 |

(Continued)

FOREIGN PATENT DOCUMENTS

| | | | | |
|---|---|---|---|---|
| CN | 107826769 A | * | 3/2018 | |
| CN | 110203703 A | * | 9/2019 | ............ B65G 53/24 |

(Continued)

*Primary Examiner* — Joseph A Dillon, Jr.
(74) *Attorney, Agent, or Firm* — Perkins Coie LLP

(57) ABSTRACT

A vacuum-type powder transfer system capable of quantitatively supplying a constant amount of powder in a wide range from a small amount to a large amount, and a vacuum-type powder transfer method using the vacuum-type powder transfer system are disclosed. In an aspect, the vacuum-type powder transfer system includes a storage part configured to store powder, one or more chamber parts configured to accommodate the powder transferred from the storage part, a hopper part disposed to control fluid communication with the one or more chamber parts, and configured to accommodate the powder transferred from the storage part, and a vacuum pressure forming part configured to provide vacuum pressure to the one or more chamber parts, wherein the powder is split and supplied to the one or more chamber parts or the hopper part.

14 Claims, 3 Drawing Sheets

(56) References Cited

U.S. PATENT DOCUMENTS

| | | | | |
|---|---|---|---|---|
| 7,080,960 B2* | 7/2006 | Burnett | ............... | E21B 21/065 406/33 |
| 7,228,990 B2* | 6/2007 | Schmidt | ............... | E04C 5/076 406/33 |
| 7,785,044 B2* | 8/2010 | Sundholm | ............... | F04F 5/52 406/48 |
| 7,854,205 B2* | 12/2010 | Beaujot | ............... | B65G 53/60 111/176 |
| 7,972,087 B2* | 7/2011 | Davison | ............... | G01G 13/28 406/28 |
| 8,147,169 B1* | 4/2012 | Kvalheim | ............... | B65G 65/36 406/114 |
| 8,430,605 B2* | 4/2013 | Dietterich | ............... | B65G 53/60 290/43 |
| 8,747,029 B2* | 6/2014 | Thorn | ............... | B65G 53/66 406/197 |
| 8,876,439 B2* | 11/2014 | Sheehan | ............... | B01J 8/0015 198/534 |
| 9,433,908 B2* | 9/2016 | Stevenson | ............... | B65G 53/66 |
| 10,703,590 B1* | 7/2020 | Struble, Jr. | ............... | B65G 69/181 |
| 11,498,756 B2* | 11/2022 | Sundholm | ............... | B65F 5/005 |
| 2007/0183855 A1* | 8/2007 | Sundholm | ............... | F04F 5/20 406/141 |
| 2008/0145155 A1* | 6/2008 | Volkmann | ............... | B65G 53/60 406/12 |
| 2014/0248097 A1* | 9/2014 | Naylor | ............... | A01C 7/20 406/122 |
| 2016/0272439 A1* | 9/2016 | Kelly | ............... | F04F 5/52 |
| 2016/0280473 A1* | 9/2016 | Veselov | ............... | B65G 53/66 |
| 2019/0255794 A1* | 8/2019 | Bishop | ............... | B23Q 11/005 |
| 2021/0339210 A1* | 11/2021 | Lee | ............... | B01F 27/1152 |
| 2023/0044045 A1* | 2/2023 | Sundholm | ............... | B65G 53/60 |

FOREIGN PATENT DOCUMENTS

| | | | | |
|---|---|---|---|---|
| DE | 3323162 A | * | 1/1985 | ............ B65G 53/24 |
| JP | 04217511 A | * | 8/1992 | |
| JP | H06-12479 U | | 2/1994 | |
| JP | 2000-128543 A | | 5/2000 | |
| JP | 5274561 B | | 5/2013 | |
| KR | 10-1678813 B1 | | 11/2016 | |
| KR | 10-2016-0141448 A | | 12/2016 | |
| KR | 10-1865808 B | | 6/2018 | |
| KR | 10-2020-0107146 A | | 9/2020 | |
| KR | 102453390 B1 | * | 10/2022 | |
| WO | WO-9424031 A1 | * | 10/1994 | ............ B01J 8/003 |

* cited by examiner

VACUUM-TYPE POWDER TRANSFER SYSTEM AND METHOD

CROSS REFERENCE TO RELATED APPLICATION

The present application claims priority and benefits of Korean Patent Application No. 10-2022-0021502, filed Feb. 18, 2022, the entire contents of which is incorporated herein by reference for all purposes.

TECHNICAL HELD

The present disclosure relates generally to a vacuum-type powder transfer system, and more particularly to a system capable of transferring a powdery active material of a secondary battery.

BACKGROUND

A secondary battery is a battery that performs charging and discharging, and generally includes a cathode coated with a cathode active material, an anode coated with an anode active material, a separator interposed between the cathode and the anode, and an electrolyte.

In general, a manufacturing process of a secondary battery includes transferring and mixing a powdery electrode active material that includes the aforementioned cathode active material or anode active material.

SUMMARY

The disclosed technology can be implemented in some embodiments to provide a system that can transfer a powdery active material of a secondary battery at an amount ranging from a small amount to a large amount by means of vacuum pressure.

The disclosed technology can also be implemented in some embodiments to provide a powder transfer method that can continuously quantitatively supply a constant amount of powder by using a vacuum-type powder transfer system.

In some example implementation, powder can be used for product production to downstream equipment by a vacuum suction method while precisely controlling a powder transfer amount. In an example powder transfer system, the powder is discharged downstream after a powder storage part is filled with the powder to a predetermined volume, so there is an inevitable limit in continuously supplying a large amount of powder.

The disclosed technology can be implemented in some embodiments to address such issues by providing a vacuum-type powder transfer system capable of supplying powder in a wide range from a small amount to a large amount by means of vacuum pressure.

The disclosed technology can also be implemented in some embodiments to address such issues by providing a vacuum-type powder transfer method using a vacuum-type powder transfer system.

In some embodiments of the disclosed technology, a vacuum-type powder transfer system includes: a storage part configured to store powder; one or more chamber parts configured to accommodate the powder transferred from the storage part; a hopper part disposed to control fluid communication with the one or more chamber parts, and configured to accommodate the powder transferred from the storage part; and a vacuum pressure forming part configured to provide vacuum pressure to the one or more chamber parts, wherein the powder may be split and supplied to the one or more chamber parts or the hopper part.

The vacuum-type powder transfer system may further include: a common transfer line connected to the storage part; a first transfer line connected to the one or more chamber parts; a second transfer line connected to the hopper part; and a branch pipe connected to the common transfer line and configured to supply the powder by diverting the powder to the first transfer line or the second transfer line.

In an embodiment of the disclosed technology, the hopper part may further include an anti-abrasion plate, namely wear prevention plate in front of an outlet end of the second transfer line, the outlet end being inserted in a tangential direction into an inner wall of the hopper part.

Furthermore, the anti-abrasion plate may be configured such that a virtual axis extending from an inner side of an outer peripheral surface of the outlet end of the second transfer line toward the inner wall of the hopper part is disposed between a proximal end and a distal end of the anti-abrasion plate.

Preferably, the hopper part may be disposed under the one or more chamber parts.

In addition, the hopper part may have a storage capacity larger than a storage capacity of each of the chamber parts.

According to another aspect of the disclosed technology, there is provided a vacuum-type powder transfer method using the aforementioned vacuum-type powder transfer system, the vacuum-type powder transfer method including: a step of providing the powder to the storage part; a step of determining a powder supply amount; a first transfer step of sucking the powder from the storage part to the one or more chamber parts when the powder supply amount is equal to or less than the storage capacity of each of the chamber parts; a second transfer step of sucking the powder from the storage part to the hopper part when the powder supply amount is greater than the storage capacity of each of the chamber parts; and a step of discharging the powder accommodated in the hopper part to downstream equipment.

The vacuum-type powder transfer method may further include a step of feeding the powder from the one or more chamber parts to the hopper part after the first transfer step.

In an embodiment of the disclosed technology, the second transfer step may further include a step of allowing the chamber parts and the hopper part to be in fluid communication with each other and providing the vacuum pressure to each of the chamber parts and the hopper part by the vacuum pressure forming part.

In the second transfer step, the powder may rotate and flow along the inner wall of the hopper part.

In addition, the powder may be guided to a powder transfer path selected from the group consisting of the first transfer step, the second transfer step, or a combination thereof The features and advantages of the disclosed technology will be more clearly understood from the following detailed description when taken in conjunction with the accompanying drawings.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the disclosed technology can provide a powder transfer system having a simple structure capable of continuously quantitatively supplying a constant amount of powder through a vacuum conveyor.

The present disclosure is designed to individually suction and guide powder into one or more small-capacity chamber parts and a large-capacity hopper part, so that the powder can be transferred at an amount ranging from a small amount to a large amount.

In addition, some embodiments of the disclosed technology can transfer most (about 95%) of a set supply amount of the powder to the large-capacity hopper part first, and then transfer the rest (about 5%) of the set supply amount of the powder to the one or more small-capacity chamber parts, so that the powder can be quickly and precisely supplied in the set supply amount to downstream equipment (mixing part).

BRIEF DESCRIPTION OF THE DRAWINGS

Certain objectives, features, and advantages of the disclosed technology are illustrated by the following detailed description with reference to the accompanying drawings.

DETAILED DESCRIPTION

Hereinbelow, some embodiments of the disclosed technology will be described in detail with reference to the accompanying drawings.

Some embodiments of the disclosed technology relate to a powder transfer system capable of sucking powder used for product production through a vacuum suction method and transferring it to downstream equipment, and includes a storage part, a chamber part, a hopper part, and a vacuum pressure forming part. In some implementations, the powder may be an electrode active material processed into a granular or powdery form required for manufacturing a secondary battery, and the electrode active material includes a cathode active material or an anode active material.

Figure 1:
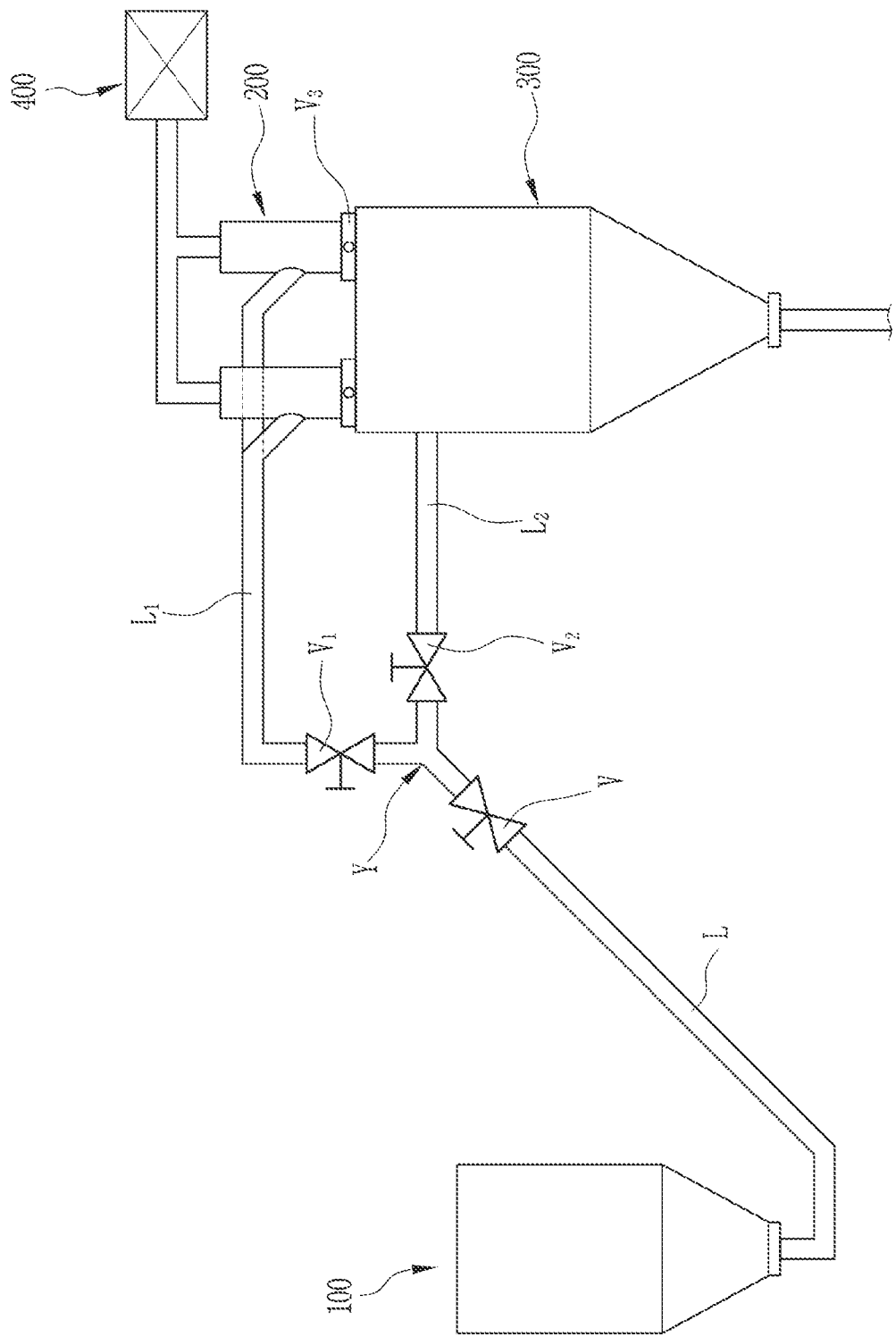
FIG. 1 illustrate an example of a vacuum-type powder transfer system based on some embodiments of the disclosed technology.

FIG. 1 illustrate an example of a vacuum-type powder transfer system based on some embodiments of the disclosed technology.

Referring to FIG. 1, a vacuum-type powder transfer system based on some embodiments of the disclosed technology includes a storage part 100 for storing powder, one or more chamber parts 200 for accommodating the powder supplied from the storage part 100, and a hopper part 300 disposed under the one or more chamber parts 200, and a vacuum pressure forming part 400 for providing vacuum pressure inside the one or more chamber parts 200.

As described above, the storage part 100 is configured to guide the powder downstream while storing the powder.

In some implementations of the disclosed technology, the powder may be selectively guided to the one or more chamber parts 200 or the hopper part 300. In one example, the powder may be sucked and guided by means of a branch pipe Y along a powder transfer path from the storage part 100 to the one or more chamber parts 200 or the hopper part 300. The branch pipe Y may be any diverting means capable of branching from a common transfer line into two transfer lines.

In some implementations of the disclosed technology, a common transfer line L connected to the storage part 100, a first transfer line L1 connected to the at last one chamber part 200, and a second transfer line L2 connected to the hopper part 300 may be connected to each other by the Y-shaped branch pipe Y. Optionally, each of the common transfer line L, the first transfer line L1, and the second transfer line L2 may be a flexible tube made of a material having mechanical properties, abrasion resistance, and chemical resistance even in collision/contact with the powdery electrode active material, for example, a urethane material.

As illustrated, the Y-shaped branch pipe Y branches into two branches of the first transfer line L1 and the second transfer line L2 from the common transfer line L. As a result, the powder may be split and supplied to the one or more chamber parts 200 or the hopper part 300.

In addition, some embodiments of the disclosed technology may selectively divert the powder transfer path to the chamber part 200 and the hopper part 300 and/or control a supply amount of the powder by means of a valve. To this end, some embodiments of the disclosed technology may include a main valve V for opening and closing the common transfer line L to control the flow of the powder supplied downstream from the storage part 100, and a first valve V1 for opening and closing the first transfer line L1 to control the flow of the powder supplied to the one or more chamber parts 200. Some embodiments of the disclosed technology may include a second valve V2 for opening and closing the second transfer line L2 to control the flow of the powder supplied to the hopper part 300. As illustrated, the main valve V couples an outlet end of the common transfer line L to an inlet end of the Y-shaped branch pipe Y, the first valve V1 couples a first side outlet end of the Y-shaped branch pipe Y to an inlet end of the first transfer line L1, and the second valve V2 couples a second side outlet end of the Y-shaped branch pipe Y to an inlet end of the second transfer line L2. With this structure, the present disclosure may guide the powder from the storage part 100 to the one or more chamber parts 200 or from the storage part 100 to the hopper part 300 according to an operator's selection through opening and closing of the first and second valves V1 and V2. In some embodiments of the disclosed technology, each of the main valve V, the first valve V1, and the second valve V2 may be configured as a solenoid valve that precisely controls the transfer path and supply amount of the powder.

In addition, a lining for abrasion protection, preferably a ceramic lining, may be additionally disposed in an inner flow path of the branch pipe Y. During transfer of the powder, the branch pipe Y may change the direction of the powder toward the first transfer line L1 or the second transfer line L inside the branch pipe Y through the lining described above to prevent abrasion of the inner flow path due to collision of the powder with the inner flow path of the branch pipe Y, thereby extending lifespan of the branch pipe Y.

The one or more chamber parts 200 receive the powder through the common transfer line L and the first transfer line L1 and temporarily store it therein. As illustrated, the one or more chamber parts 200 may be positioned on top of the hopper part 300 in a parallel arrangement with respect to the storage part 100.

In some embodiments of the disclosed technology, air is sucked together with the powder from the storage part 100 by vacuum pressure of the vacuum pressure forming part 400 into each of the chamber parts 200. While the powder is collected in a lower portion of the chamber part 200 under influence of gravity, the air is discharged into the atmosphere through a process of creating a vacuum inside the chamber part 200 by driving the vacuum pressure forming part 400. The powder accommodated in each of the small-capacity chamber parts 200 is discharged into the large-capacity hopper part 300 by opening an opening/closing valve V3. Of course, the chamber parts 200 may each sequentially and quantitatively supply a constant amount of the powder to the hopper part 300, which is downstream equipment, by sequentially opening the opening/closing valve V3.

As is well known to those skilled in the art, the vacuum pressure forming part 400 may be, for example, a vacuum conveyor, and creates a vacuum inside each of the chamber parts 200 while discharging air to the outside through a vacuum hose (not illustrated) connected to each of the chamber parts 200 by driving a vacuum pump. In this case, due to a difference in pressure between the storage part 100 and the chamber parts 200, the powder is sucked into each of the chamber parts 200 and flows. The vacuum pressure forming part 400 may include a filter for blocking movement of the powder toward the vacuum pump.

Each of the one or more chamber parts 200 may include the opening/closing valve V3 for controlling the transfer of the powder from the inside of the chamber part 300 to the hopper part 300, and a weight sensor (not illustrated) for measuring the weight of the powder supplied to the chamber part 200. The powder transfer system based on some embodiments of the disclosed technology may block or restart suction of the powder into the one or more chamber parts 200 by comparing a powder supply amount detected by the weight sensor disposed under each of the chamber parts 200 with a powder storage capacity preset for each of the chamber parts 200.

In some embodiments of the disclosed technology, the hopper part 300 is provided under the one or more chamber parts 200 to be in fluid communication therewith. More specifically, the hopper part 300 is disposed such that the fluid communication thereof with the one or more chamber parts 200 is controlled.

That is, the hopper part 300 may open the opening/closing valve V3 of each of the chamber parts 200 to receive the powder accommodated in each of the chamber parts 200, and receive a large amount of the powder through the common transfer line L and the second transfer line L2.

In addition, the hopper part 300 may include a weight sensor (not illustrated) for measuring the weight of the powder supplied to the hopper part 300. The suction of the powder into the hopper part 300 may be blocked or restarted by comparing a powder supply amount detected by the weight sensor disposed under the hopper part 300 and a power storage capacity preset for the hopper part 300.

As described above, the hopper part 300 is configured to receive the powder directly from the storage part 100 without passing through the chamber parts 200. That is, the powder may be sucked into the hopper part 300 through the common transfer line L, the Y-shaped branch pipe Y, and the second transfer line L2 from the storage part 100. To this end, some embodiments of the disclosed technology create a vacuum inside the hopper part 300 by driving the vacuum pressure forming part 400 to allow inflow of the powder from the storage part 100 into the hopper part 300, and implements suction of a large amount of the powder under opening of the opening/closing valve V3 for controlling fluid communication between each of the chamber parts 200 and the hopper part 300.

Figure 2A:
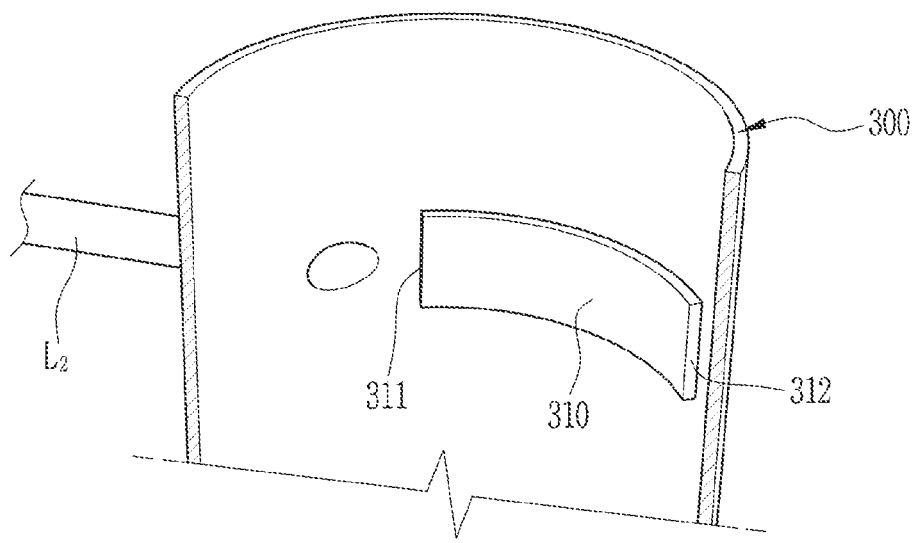
FIG. 2A is a partially cut-away view schematically illustrating an example of a coupling portion between a hopper part and a second transfer line.
Figure 2B:
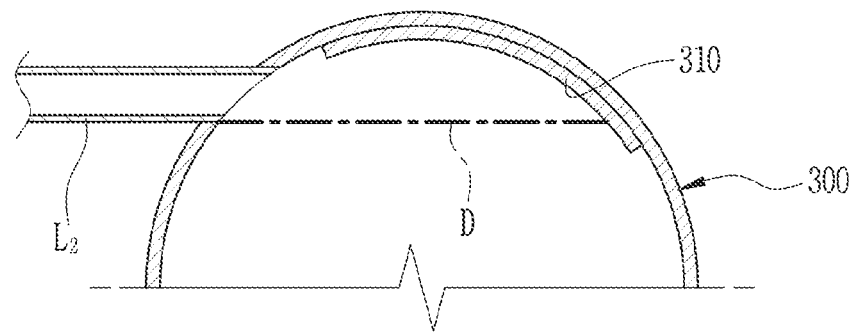
FIG. 2B is a cross-sectional view schematically illustrating an example of the coupling portion between the hopper part and the second transfer line.

Preferably, in some embodiments of the disclosed technology, as illustrated in FIGS. 2A and 2B, an outlet end of the second transfer line L2 is inserted and installed in communication with an inner wall of the hopper part 300 in a tangential direction in order to rotate the powder to be introduced through the second transfer line L2 along the inner wall of the hopper part 300. Therefore, the powder is introduced into an inner space of the hopper part 300, that is, a rotating space, in the tangential direction, and rotates and flows along the inner wall of the hopper part 300 in a circumferential direction. This induces a uniform flow rate distribution of the powder in the inner space of the hopper part 300 to prevent the accumulation of the powder in a region where the flow rate is low and to prevent adhesion/aggregation of the powder on the inner wall of the hopper part 300. Furthermore, the rotation of the powder in the hopper part 300 helps to easily collect the powder to a tapered lower portion of the hopper part 300 in a gravity sedimentation method.

FIG. 2A is a partially cut-away view schematically illustrating an example of a coupling portion between a hopper part and a second transfer line. FIG. 2B is a cross-sectional view schematically illustrating an example of the coupling portion between the hopper part and the second transfer line.

The powder introduced tangentially to the inner wall of the hopper part 300 through the second transfer line L2 as described above collides with the inner wall of the hopper part 300 and causes abrasion of the inner wall. For this reason, an anti-abrasion plate 310 is disposed in front of the outlet end of the second transfer line L2. The anti-abrasion plate 310 may be made of a ceramic material having a smooth surface, but is not limited thereto, and may also be made of a metal material having a smooth surface.

As illustrated, the anti-abrasion plate 310 may extend in a curved shape along the inner wall of the hopper part 300 so as to be in close contact with the inner wall of the hopper part 300. The anti-abrasion plate 310 has a proximal end 311 adjacent to the outlet end of the second transfer line L2 and a distal end 312 opposite to the proximal end in a longitudinal direction (or circumferential direction). The anti-abrasion plate 310 may extend such that a virtual axis D (indicated by a dashed-dotted line in FIG. 2B) extending from an inner side of an outer peripheral surface of the outlet end of the second transfer line L2 toward the inner wall of the hopper part 300 is positioned in an inner region of the anti-abrasion plate 310. In other words, the virtual axis D is disposed between the proximal end 311 and the distal end 312.

Figure 3:
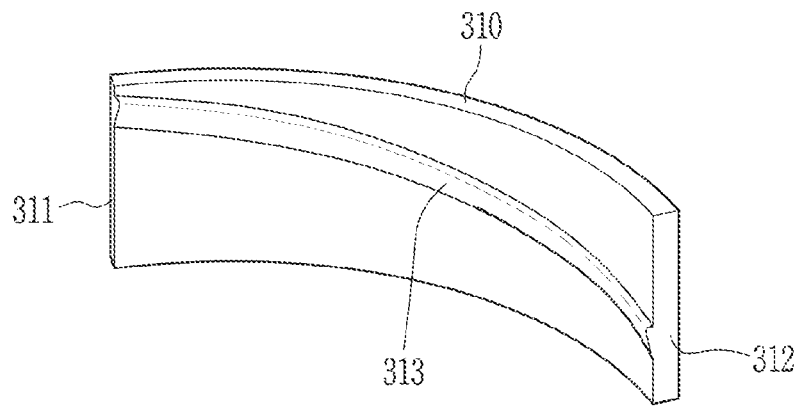
FIG. 3 is a view schematically illustrating an example of an anti-abrasion plate to be employed in the hopper part.

FIG. 3 is a view schematically illustrating an example of an anti-abrasion plate to be employed in the hopper part.

Optionally, the powder falls to the lower portion of the hopper part 300 while it rotates along the inner wall of the hopper part 300. In this case, some embodiments of the disclosed technology may be designed to forcibly guide a rotating flow of the powder to be inclined downward along the circumferential direction of the inner wall of the hopper part 300. To this end, the anti-abrasion plate 310 disposed in front of the outlet end of the second transfer line L2 includes a thin and elongated guide protrusion 313 inclined downward in a longitudinal direction of the anti-abrasion plate 310 (see FIG. 3). The guide protrusion 313 extends at a downwardly inclined slope from the proximal end 311 to the distal end 312 of the anti-abrasion plate 310 so as to guide the powder to fall in a vortex shape, thereby preventing a turbulent flow from occurring in the hopper part 300 due to scattering of the powder.

As illustrated, the hopper part 300 has a conical structure at the lower portion thereof to help efficient downward movement of the powder. Therefore, the hopper part 300 based on some embodiments of the disclosed technology is in communication with unillustrated downstream equipment, for example, a mixing part, to discharge the powder.

Figure 4:
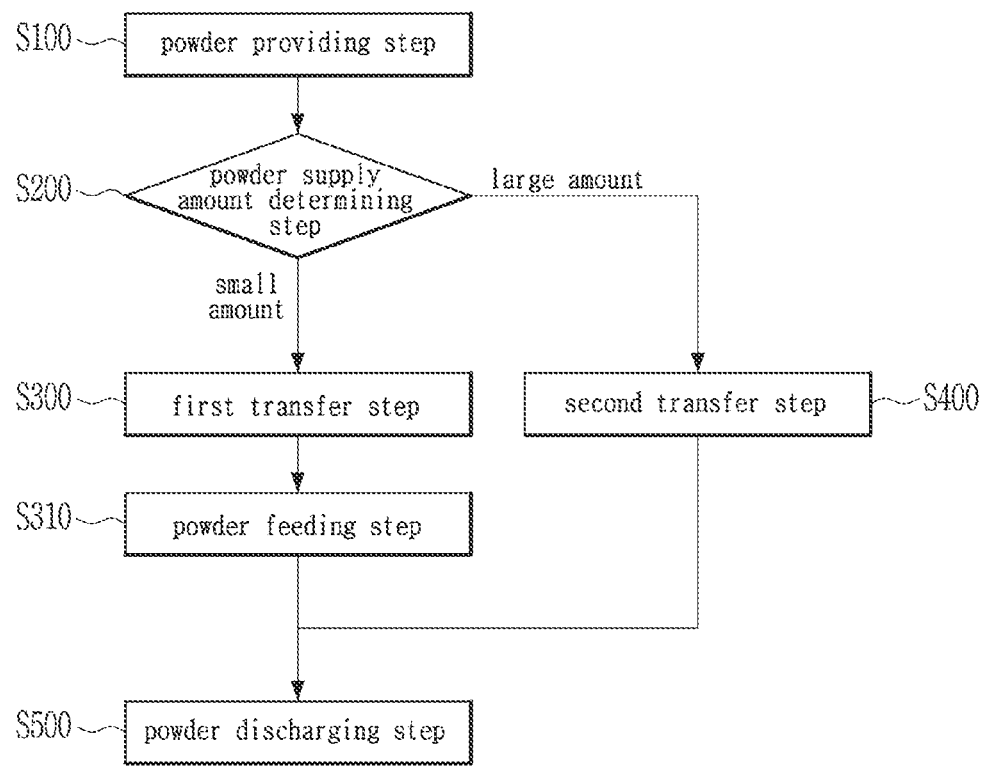
FIG. 4 is a flowchart illustrating a powder transfer method using the vacuum-type powder transfer system based on some embodiments of the disclosed technology.

FIG. 4 is a flowchart illustrating a powder transfer method using the vacuum-type powder transfer system based on some embodiments of the disclosed technology.

As described above, since the vacuum-type powder transfer system based on some embodiments of the disclosed technology is designed to quantitatively supply a constant amount of the powder in a wide range from a small amount to a large amount by a vacuum suction method, the powder transfer method will be described in more detail with reference to the flowchart of FIG. 4.

Some embodiments of the disclosed technology may control the amount of powder supplied from a storage part 100 to downstream equipment, and, at S100, may include providing the powder to the storage part 100.

Here, the powder may be a powdery electrode active material required for manufacturing a secondary battery. The powder may be transferred to a mixing part, which is downstream equipment, through the vacuum-type powder transfer system implemented based on some embodiments of the disclosed technology to be processed into a mixed material having specific properties.

In order to prevent a problem due to insufficient or excessive input of the powder to the mixing part, some embodiments of the disclosed technology may quantitatively supply a constant amount of the powder according to a preset amount. After the powder is prepared, some embodiments of the disclosed technology may include, at S200, determining a powder supply amount to transfer the powder in a preset amount using the vacuum transfer system (see FIG. 1).

At S200, by determining the powder supply amount, some embodiments of the disclosed technology may selectively quantitatively supply a constant amount of the powder in a wide range from a small amount to a large amount.

In some embodiments of the disclosed technology, one or more chamber parts 200 are provided on the top of a hopper part 300, and each of the chamber parts 200 is connected to a vacuum pressure forming part 400. As illustrated, each of the chamber parts 200 may be, for example, a relatively small-capacity chamber having a storage capacity of 50 kg, and the hopper part 300 may be, for example, a relatively large-capacity hopper having a storage capacity of equal to or greater than 50 kg.

When the powder supply amount is set to be less than the storage capacity of the chamber part 200 (that is, when the powder supply amount is small), some embodiments of the disclosed technology include, at S300, a first transfer operation to suck the powder from the storage part 100 to the one or more chamber parts 200. In the first transfer operation S300, a main valve V and a first valve V1 are opened through the operation of a controller (not illustrated) and the vacuum pressure forming part 400 is driven to create a vacuum inside each of the chamber parts 200, so that the powder stored in the storage part 100 is guided into the one or more chamber parts 200 along a first powder transfer path composed of a common transfer line L, a branch pipe Y, and a first transfer line L1. At this time, a second valve V2 is maintained in a closed state to control transfer of the powder to the hopper part 300. An opening/closing valve V3 is provided between each of the chamber parts 200 and the hopper part 300, so that a constant amount of the powder is stored in each of the chamber parts 200.

After the constant amount of the powder corresponding to a preset amount is supplied to each of the chamber parts 200 through the first transfer operation S300, some embodiments of the disclosed technology include, at S310, feeding the powder from each of the chamber parts 200 into the hopper part 300. At S310, the feeding of the powder may include stopping the vacuum pressure forming part 400 and opening the opening/closing valve V3 to guide the powder accommodated in each of the small-capacity chamber parts 200 into the large-capacity hopper part 300.

On the other hand, when the powder supply amount is set to be greater than the storage capacity of the chamber part 200 (that is, when the powder supply amount is large), some embodiments of the disclosed technology include, at S400, a second transfer operation to suck the powder from the storage part 100 to the hopper part 300.

The second transfer operation S400 may include opening the main valve V, the second valve V2, and the opening/closing valve V3 through the operation of the controller, and operating the vacuum pressure forming part 400 to create a vacuum created inside each of the chamber parts 200 and the hopper part 300, so that the powder stored in the storage part 100 is guided into the hopper part 300 along a second powder transfer path composed of the common transfer line L, the branch pipe Y, and a second transfer line L2. At this time, the first valve V1 is maintained in a closed state to control transfer of the powder to each of the chamber parts 200.

Optionally, in some embodiments of the disclosed technology, in order to supply a large amount of the powder to the mixing part more quickly and more precisely, the powder may be transferred first to the hopper part 300 through the second transfer step S400 until a weight sensor senses that about 95% of a set supply amount of the powder is reached, and then the second transfer step S400 may be stopped and the first transfer step S300 may be operated to supply about 5% of the set supply amount of the powder (here, 5% is less than or equal to the storage capacity of the chamber part 200) to the one or more chamber parts 200 to supply a preset amount of the powder to the mixing part. This makes it possible to accurately control the powder supply amount according to the set supply amount and to significantly reduce transfer speed of the powder compared to when only the small-capacity chamber parts 200 are operated. The description above is merely an example for supplying the powder at the set supply amount through the first transfer step S300 after the second transfer step S400, and the present disclosure is not limited thereto. Some embodiments of the disclosed technology may include the first transfer operation S300, or the second transfer operation S400, or both the first and second transfer operations S300 and S400 to quantitatively supply a constant amount of the powder in a range from a small amount to a large amount.

After feeding the powder at S310 and/or after performing the second transfer operations S400, the transfer of the powder is finished by discharging, at S500, the powder to downstream equipment by opening an opening/closing means (not illustrated) provided under the hopper part 300.

Only a few implementations and examples are described and other implementations, enhancements and variations can be made based on what is described and illustrated in this patent document.

What is claimed is:

1. A vacuum-type powder transfer system comprising:
a storage part configured to store powder;
one or more chamber parts coupled to the storage part to accommodate the powder transferred from the storage part;
a hopper part coupled to the one or more chamber parts to control fluid communication with the one or more chamber parts, and coupled to the storage part to accommodate the powder transferred from the storage part; and
a vacuum pressure forming part coupled to the one or more chamber parts to provide vacuum pressure to the one or more chamber parts,
wherein the powder is split and supplied to the one or more chamber parts or the hopper part.

2. The vacuum-type powder transfer system of claim 1, further comprising:
a common transfer line connected to and extending from the storage part;
a first transfer line connected to and extending from the one or more chamber parts;
a second transfer line connected to and extending from the hopper part; and
a branch pipe connected to the common transfer line, the first transfer line, and the second transfer line to supply the powder carried by the common transfer line to at least one of the first transfer line or the second transfer line by diverting a path of the powder to the first transfer line or the second transfer line.

3. The vacuum-type powder transfer system of claim 1, wherein the hopper part further comprises an anti-abrasion plate disposed in front of an outlet end of a second transfer line connected to the hopper part, the outlet end being inserted in a tangential direction into an inner wall of the hopper part.

4. The vacuum-type powder transfer system of claim 3, wherein the anti-abrasion plate is configured such that a virtual axis extending from an inner side of an outer peripheral surface of the outlet end of the second transfer line toward the inner wall of the hopper part is disposed between a proximal end and a distal end of the anti-abrasion plate.

5. The vacuum-type powder transfer system of claim 1, wherein the hopper part is disposed under the one or more chamber parts.

6. The vacuum-type powder transfer system of claim 1, wherein the hopper part has a storage capacity larger than a storage capacity of each of the chamber parts.

7. A vacuum-type powder transfer method using a vacuum-type powder transfer system, the vacuum-type powder transfer method comprising:
providing powder to a storage part of the vacuum-type powder transfer system;
determining a supply amount of the powder;
performing a first transfer operation to suck the powder from the storage part to one or more chamber parts of the vacuum-type powder transfer system in a case that the powder supply amount is equal to or less than a storage capacity of each of the chamber parts;
performing a second transfer operation to suck the powder from the storage part to a hopper part of the vacuum-type powder transfer system in a case that the powder supply amount is greater than the storage capacity of each of the chamber parts; and
discharging the powder accommodated in the hopper part to downstream equipment.

8. The vacuum-type powder transfer method of claim 7, further comprising feeding the powder from the one or more chamber parts to the hopper part after performing the first transfer operation.

9. The vacuum-type powder transfer method of claim 7, wherein the second transfer step further comprises allowing the chamber parts and the hopper part to be in fluid communication with each other and providing the vacuum pressure to each of the chamber parts and the hopper part by a vacuum pressure forming part of the vacuum-type powder transfer system.

10. The vacuum-type powder transfer method of claim 7, wherein the second transfer operation includes allowing the powder to rotate and flow along an inner wall of the hopper part.

11. The vacuum-type powder transfer method of claim 7, wherein the powder is guided to a powder transfer path by performing the first transfer operation, the second transfer operation, or both the first and second transfer operations.

12. The vacuum-type powder transfer method of claim 7, wherein the one or more chamber parts are coupled to the storage part to accommodate the powder transferred from the storage part.

13. The vacuum-type powder transfer method of claim 7, wherein the hopper part is coupled to the one or more chamber parts to control fluid communication with the one or more chamber parts, and coupled to the storage part to accommodate the powder transferred from the storage part.

14. The vacuum-type powder transfer method of claim 7, wherein the vacuum pressure forming part is coupled to the one or more chamber parts to provide vacuum pressure to the one or more chamber parts.

* * * * *